Oct. 19, 1965    G. O. WALTER    3,212,399
FILM MARKING MECHANISM
Filed Dec. 21, 1962    2 Sheets-Sheet 1

INVENTOR.
GERARD O. WALTER
BY *A. J. De Angelis*
ATTORNEY

Oct. 19, 1965

G. O. WALTER 3,212,399

FILM MARKING MECHANISM

Filed Dec. 21, 1962

INVENTOR.
GERARD O. WALTER

BY *A. J. De Angelis*

ATTORNEY

United States Patent Office 3,212,399
Patented Oct. 19, 1965

3,212,399
FILM MARKING MECHANISM
Gerard O. Walter, Westbury, N.Y., assignor to Sperry Rand Corporation, New York, N.Y., a corporation of Delaware
Filed Dec. 21, 1962, Ser. No. 246,628
10 Claims. (Cl. 88—24)

The invention relates to film marking mechanisms, and, more particularly to apparatus for automatically and continuously recording data on a film strip in a photographic camera, coincidentally with the photographing of documents thereon.

It is often desirable to photograph a plurality of documents and record data individual to each document sequentially onto a film strip. The data recorded may, for example, identify each document photographed onto the film, or provide means for locating the document for viewing. In some applications, it is desirable to place a detectable mark between frames of the film strip for sensing by automatic frame cutting and mounting machines.

In certain arrangements, documents of varying length are photographed sequentially onto a roll of film, necessitating that the sensing marks for cutting occur at varying intervals along the film strip. However, for proper operation of the frame cutter the mark location for each document must be a certain fixed distance from the edge of the photographic copy of the document, notwithstanding that the frame length vary.

It is also desirable, in certain applications to vary the location of the sensing marks in relation to the edges of the document photographs. For example, a greater or lesser amount of excess film may be required with each cut frame for various frame mounting techniques.

It is, therefore, an object of this invention to provide improved film marking apparatus for recording data onto a film strip simultaneously with the exposure thereof.

Another object is to provide automatically and continuously operating film marking apparatus.

A further object is to provide such film marking apparatus particularly suitable for modern day, relatively high speed photographic copiers.

Still another object is to provide film marking apparatus for recording data onto a film strip simultaneously with the photographing of both sides of a document, while such document is moved past a "photograph" station at relatively high speeds.

Yet another object is to provide such a film marking apparatus for simultaneously recording data onto photographs of both sides of a document by means of a single marking device.

In carrying out the invention, according to a preferred embodiment, there is provided a mirror and lens camera arrangement for simultaneously projecting the images of a double sided document onto a roll of microfilm in side-by-side relation for reproduction thereon, while simultaneously placing data associated with each side of the document in the camera's optical path for simultaneous photographing onto the film in a predetermined position relative to the document photographic images.

An electronic flasher and a timer are provided. The timer is activated by means of a trip switch engageable by the leading edge of the document to be photographed, as such document arrives at a certain distance in advance of a "photograph station." Upon activation, the timer causes the electronic flasher to provide a flash of intense light. The flash of light is directed by a light transmitting medium through light windows of specific configuration to project two images of the window configuration into the camera's optical path for photographing. The windows are configured in accordance with the data to be recorded onto the film to project light images of such data. For example, if it is desired to record the letter "A," the light window is formed in the shape of the letter "A" to project a light image of such letter.

The electronic flasher provides light of such short duration that, although the camera film is in relatively fast continuous motion, the film motion is photographically stopped by the flash of light to provide a sharp and distinct image of the data on the film coincident with photographing of the document. The spatial relationship between the data and document images on the film may be varied by the timer by retarding or advancing the time of occurence of the light flash.

Features and advantages of the invention will be seen from the above, from the following description of operation of the preferred embodiment when considered in conjunction with the drawing and from the appended claims.

For convenience, the invention will be described as applied to a double sided microfilm copier in which individual documents of varying lengths are carried past a "photograph station" for sequential photographic reproduction onto a roll of microfilm carried at relatively high speed by a film transport; distinct "sensing" marks being automatically and continuously photographed onto the film between successive document copies for detection by sensing mechanism of an automatic film cutting machine; it being understood, nevertheless, that without departing from the scope of the invention the subject automatic and continuous film marking apparatus is applicable to other types of photographic copiers which require the recording of data onto a film strip coincident with the taking of photographs.

Figure 1:
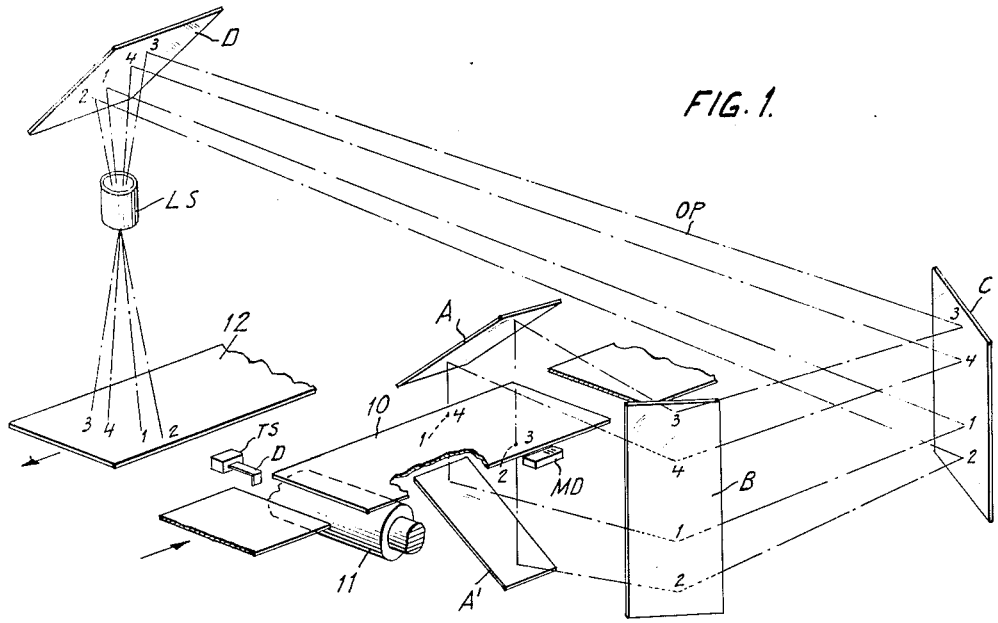
FIG. 1 is a simplified, schematic representation of the optical path arrangement for a "double sided" microfilm camera, embodying the invention.

Referring to FIG. 1, wherein is disclosed, schematically, an arrangement for simultaneously photographing both sides of a series of individual documents 10 onto a roll of microfilm 12. The arrangement reproduces the two sides or faces of each document in side-by-side position (FIG. 2) on film 12, while simultaneously recording marks 14, 14' for the sensing apparatus of automatic film cutting mechanism (not shown) on film 12 between successive document photographs. Individual documents 10 (FIG. 1) of varying length are moved past a photograph station by a document transport, generally designated 11; only a portion of which is shown. TS designates a "trip" switch, having a depending portion D positioned for engagement by documents 10 as they move towards the photograph station and arrive a predetermined distance in advance thereof. Switch TS is actuated by engagement of its portion D with the leading edge of document 10 and remains actuated until the trailing edge of the document disengages depending portion D.

Each document 10 to be photographed has a top face designated by the numerals 3, 4 and bottom face designated by the numerals 1, 2. With appropriate lighting, (not shown), the image of top face 3, 4 is reflected onto mirror A while bottom face 1, 2 image is reflected onto mirror A′, and thence by mirrors B, C, D, and by the lens system, designated LS, onto the film 12 in side-by-side position, as indicated by the numeral designations 1, 2 and 3, 4 of the document faces; the respective optical paths of the image being indicated by broken lines OP.

Figure 2:
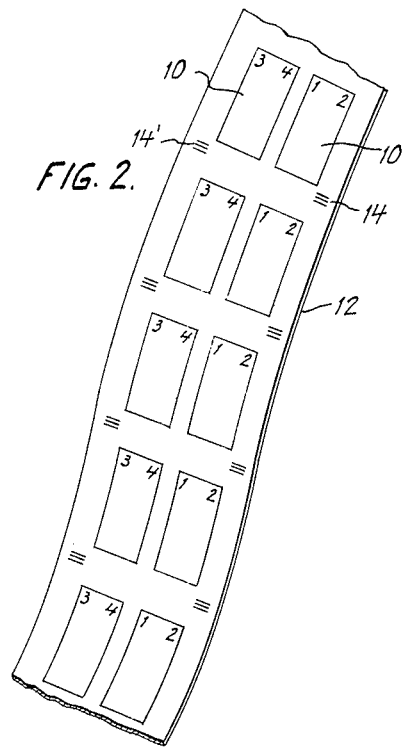
FIG. 2 is a simplified, schematic representation of a portion of a film strip showing side-by-side photographic reproductions of both faces of a series of documents and the data marks associated with such documents.

MD designates a marking device for projecting images of data to be recorded with each document face into the optical path of the camera for photographing onto the film 12 in predetermined spatial relation to the document photographs, as is indicated by the data marks, designated 14, in FIG. 2. Marking device MD (FIG. 3) consists of a light transmitting material, such as Lucite, into which a flasher tube DS2 of the GE FT30 type is embedded with its wire connections W1, W2, TW protruding from a Lucite material for conection to the electronic circuitry of FIG. 4, as will be described hereinafter. The Lucite material is masked on its outside surface to prevent the emission of light therefrom. Light windows, in the form of three slits 16 are provided in the masking material at oppositely disposed faces of marking device MD.

Upon tube DS2 being energized to produce a flash in intense light, as will be described hereinafter, such light is internally reflected within the Lucite material by the masking and can only emit at light windows 16 as slits of light. These light slits are projected into the camera's optical path (FIG. 1) and by means of mirrors A and A′ are reflected onto mirror B, and, thence, directed onto film 12, following the camera's optical path OP to produce marks 14, 14′ (FIG. 2) on the film. Marks 14, 14′ having the configuration of light windows 16 (FIG. 3), are recorded on film 12 (FIG. 2) in predetermined relation to the respective leading edges of their associated documents 10, as will now be described.

Figure 4:
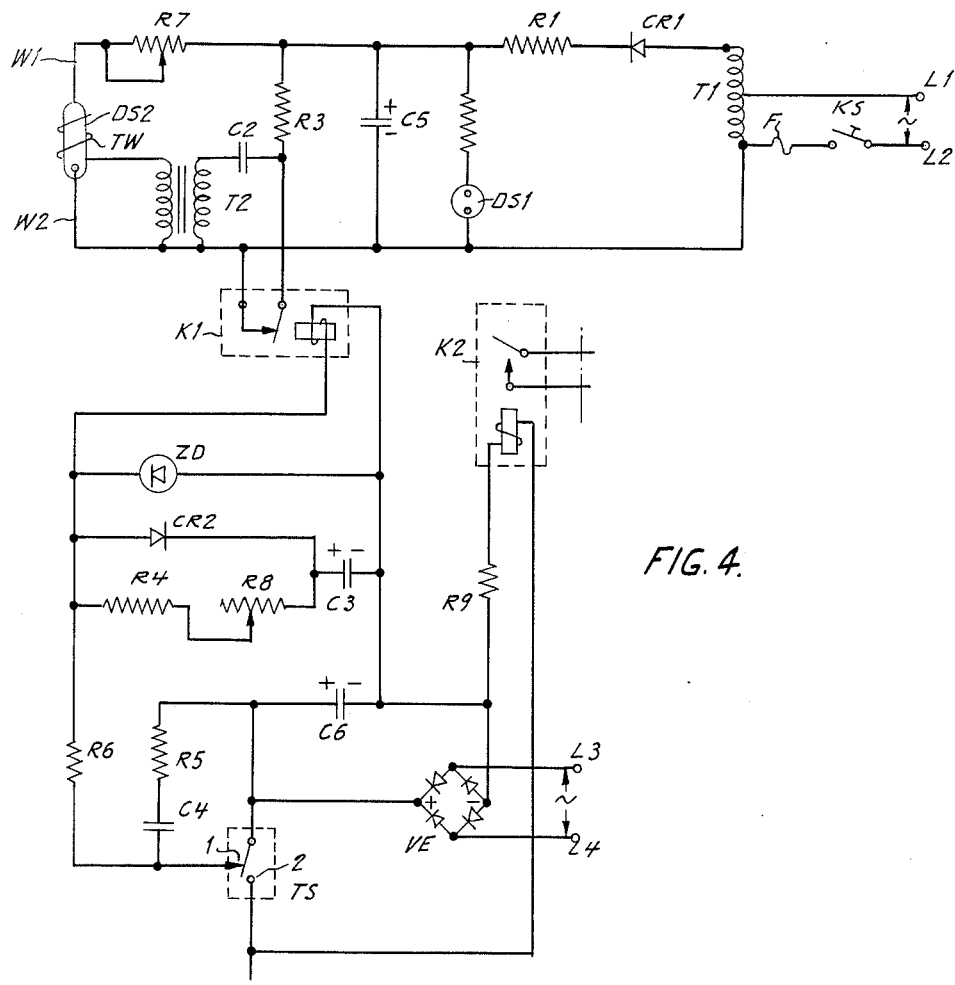
FIG. 4 is a simplified, schematic wiring diagram of an electronic flasher and timer circuit for controlling marking of a film strip.
Figure 5:
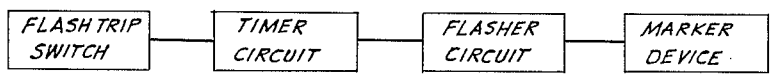
FIG. 5 is a schematic in block form of the electronic flasher and timer components.

Referring to the electronic flasher and timer circuit of FIG. 4 for controlling the energization of flasher tube DS2, alternating power from any suitable alternating power source (not shown) is applied over supply lines L1, L2 and L3, L4. In the circuit, resistors are generally designated R and capacitors C, suffix numerals being appended for differentiating one from the other. KS designates a manually operated line switch, F a fuse and T1 a step-up transformer, CR1 designates a rectifier for converting applied alternating power to uni-directional power. T2 designates a pulse generator with one end of its secondary winding connected to trigger wire TW wrapped around flasher tube DS2. DS1 designates a neon light connected across capacitor C5 for indicating operation of the circuit. K1 and K2 designate electromagnetic relays, and are shown for their deenergized condition.

Full wave rectifier VE converts alternating power applied over lines L3, L4 to uni-directional power. TS designates the document trip switch of FIG. 1, and is shown for its untripped condition. CR2 designates a rectifier and ZD designates a zener diode. Capacitor C6 serves as a line filter, while capacitor C4 in series with resistor R5 across the contacts of trip switch TS serves as contact arc suppressor. Resistors R4 and adjustable resistor R8 provide a discharge path for capacitor C3, and together therewith comprise an adjustable R-C timing circuit for controlling the release of relay K1 and, in turn, the firing of tube DS2, as will now be explained.

Assume that power is applied to the circuitry of FIG. 4, and no document is presently being conveyed by document transport 11 (FIG. 1). Under such conditions, energizing circuits are completed for capacitor C3 and the coil of relay K1 from supply lines L3, L4 through rectifier VE, contacts 1 (presently closed) of trip switch TS, current limiting resistor R6 for the coil of relay K1, and through rectifier CR2 for capacitor C3 which quickly attains fully charged condition. Zener diode ZD maintains the voltage across R-C timing circuit (R4, R8, C3) constant.

Relay K1, upon operation, separates its contacts, removing a shunting circuit from around capacitor C2 and the primary winding of pulse transformer T2, without effect at this time.

Next assume the closing of line switch KS. Under such conditions, the output of transformer T1 is rectified by diode CR1 to charge capacitor C5 through current limiting resistor R1, and capacitor C2 through resistor R3. When capacitor C5 has charged sufficiently, neon light DS1 illuminates, indicating the charged condition of the capacitor. Capacitor C5 is charged to a voltage which is insufficient in itself to cause ionization and conduction of flasher tube DS2.

Next assume that a document 10 (FIG. 1) is conveyed towards the photograph station between mirrors A and A′. As the leading edge of the document arrives at a predetermined distance in advance of the station, it engages the depending actuating arm D of the switch, actuating the switch to separate switch contacts TS1 (FIG. 4) and close contacts TS2.

Closing of contacts TS2 applies rectified power to the coil of relay K2, energizing the relay which operates activating the camera shutter controls (not shown) to photograph the document, as it moves into photograph position.

The opening of contacts TS1 of the trip switch TS interrupts the energizing circuits of the coil of relay K1 and capacitor C3. However, direct discharge of capacitor C3 is blocked by rectifier CR2. Capacitor C3, therefore, starts to discharge through timing resistors R4, R8 and the coil of relay K1, maintaining the relay energized for a predetermined time. When capacitor C3 has discharged sufficiently, relay K2 releases, reclosing its contacts.

It may be noted that the time which elapses between the actuation of trip switch TS1 and the release of relay K1 is adjustable by varying the ohmic value of resistor R8 in the R-C timing circuit, for purposes to be explained hereinafter.

The contacts of relay K1, upon reclosing, complete a discharge path for capacitor C2 through the primary winding of pulse transformer T2. Capacitor C2 discharges through the primary winding causing transformer T2 to generate a pulse in its secondary winding which is applied via trigger wire TW to flasher tube DS2. This pulse is of sufficient magnitude to cause ionization and conduction of tube DS2, which conduction is transferred to its anode-cathode circuit, causing capacitor C5 to discharge instantaneously through the tube to generate a flash of intense light.

It may be noted that the intensity of the light flash generated by tube DS2 may be adjusted by presetting the ohmic value of adjustable resistor R7 in the discharge path of capacitor C5.

The flash of light generated by tube DS2 is directed by marking device MD (FIGS. 1 and 3) through light slits 16 into the optical path of the camera (FIG. 1) to record sensing marks 14, 14′ (FIG. 2) on film 12, as has been previously explained. The flash of light is of such short duration and high intensity as to stop photographically the action of the film notwithstanding the film's continued motion to produce sharp and distinct images of light slits 16 (FIG. 3) of marking device MD onto the film.

The timing of the occurrance of the flash of light in relation to the speed of document travel is adjustable by timing resistor R8 (FIG. 4) as has been previously stated and may be preset such that the flash occurs prior to the leading edge of the document (which tripped switch TS) arriving at the photograph station. The location of the marker sensing marks 14, 14′ in relation to the leading edge of the tripping document, therefore, may be advanced or retarded, as is desired, to provide more or less excess film with each frame cut by an automatic film cutting machine controlled by sensing marks 14, 14′ (FIG. 2).

It may be noted that for a particular presetting of timing resistor R8 (FIG. 4), marks 14, 14' are recorded in fixed spatial relation to the leading edge of each successive document photographed notwithstanding that the documents may vary in length. The discharge of capacitor C5 through flasher tube DS2 causes neon light DS2 to blink, indicating operation of marking device MD.

As the trailing edge of document 10 moves past trip switch TS (FIG. 1), releasing switch actuating arm D, trip switch TS is actuated back to untripped condition, reseparating its contacts TS2 and re-engaging its contacts TS1. Separation of switch contacts TS1 interrupts the energizing circuit of the coil of relay K2 which releases to initiate deactivation of the camera shutter controls. The shutter controls (not shown) stop photographing of the document within a predetermined time after switch TS is released to insure that the entire document is photographed.

As switch TS recloses its contacts TS1, unidirectional power is reapplied to the timer circuit, causing a quick recharging of capacitor C3 through diode CR2, and re-energization of the coil of relay K1. Relay K1, upon reoperation, separates its contacts to remove the discharge path from around capacitor C2. Capacitors C5 and C2 then recharge in preparation for a succeeding flash operation initiated by the next successive document to be photographed.

Figure 3:
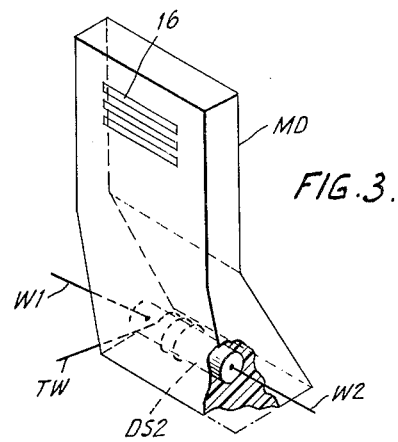
FIG. 3 is a simplified, schematic representation in perspective with portions broken away of the marking device MD of FIG. 1.

It may be noted that the subject mechanism by using timed intense light flashes to stop film motion photographically automatically and continuously records data onto microfilm travelling at relatively high speeds and places the data in predetermined specific spatial position in relation to the leading edge of the document photographed, which relative position may easily be varied. The data recorded may be mere marks or intelligible symbols, as desired, in accordance with the configuration of the light windows of marker device MD (FIG. 3).

It may also be noted that the subject control, although disclosed as applied to a double sided microfilming camera is applicable generally to photographic copiers.

As changes can be made in the above described construction, and many apparently different embodiments of this invention can be made without departing from the scope thereof, it is intended that all matter contained in the accompanying drawing be interpreted as illustrative only and not in a limiting sense.

What is claimed is:

1. In a photographic copier having means for conveying documents to be photographed past a photograph position at a certain speed and means for photographing such documents via an optical path in sequence onto a roll of film as such documents are moved past said photograph position, a device for automatically recording data associated with said documents onto said film simultaneously with the photographing of such documents, said device comprising, an image forming device operative for projecting an instantaneous light image of said data into said optical path, and control means responsive to movement of the document next to be photographed for causing operation of said image forming device.

2. A device as set forth in claim 1 wherein said control means includes timing means for delaying operation of said image forming device for a certain time measured from the arrival of the document next to be photographed to within a certain distance of said photograph position for causing recordation of said data on said film in a predetermined position relative to the photograph of such document.

3. In a photographic copier for producing photographic copies of continuously moving documents in sequence onto a roll of film via a certain optical path, a device for automatically recording data associated with such document copies onto said film simultaneously with the photographing of such documents, said device comprising; an electronic flasher operative for generating a flash of intense light of relatively short duration; light containing and conveying means having a light window of predetermined configuration for directing said generated light flashes through said light window into said optical path of said copier as a light image conforming to said window configuration, said generated light flashes being of sufficiently short duration and high intensity to photographically stop movement of said film to record said window configuration onto said film sharply and distinctly; and means responsive to document movement for controlling operation of said electronic flasher.

4. A device as set forth in claim 3 wherein are included adjustable time delay means operatively responsive to said document responsive control means for delaying operation of said electronic flasher for a predetermined time measured from the arrival of the document next to be photographed to within a certain distance of said photograph position.

5. In a double sided photographic copier having means for conveying documents to be photographed past a photograph position at a certain speed and means for simultaneously projecting images of both sides of such documents along an optical path in side-by-side relation onto a roll of film as each of such documents are moved past said photograph position for photographing said documents in sequence, a device for automatically recording data associated with each of said document images onto said film simultaneously with the photographing of such document images, said device comprising, an image forming device operative for projecting instantaneous light images of data, one data image for each document image projected, into said optical path, and control means responsive to movement of the document next to be photographed for causing operation of said image forming device.

6. In a double sided photographic copier having means for conveying documents to be photographed past a photograph position at a certain speed and means for simultaneously projecting images of both sides of such documents along an optical path in side-by-side relation onto a roll of film as each of such documents are moved past said photograph position for photographing said documents in sequence, a device for automatically recording data associated with each of said document images onto said film simultaneously with the photographing of such document images, said device comprising an electronic flasher operative for generating a flash of light of predetermined intensity; light transmitting means for projecting said generated light as light images of data, one data image for each document image projected, into said optical path for recordation onto said film; sensing means operatively responsive to movement of the document next to be photographed to within a certain distance of said photograph position; and timing means responsive to operation of said sensing means for causing operation of said electronic timer at the expiration of a certain measured time.

7. A device as set forth in claim 6 wherein said electronic flasher includes means for adjustably presetting the intensity of said generated light.

8. In a photographic copier having means for conveying documents to be photographed past a photograph position at a certain speed and means for photographing such documents via an optical path in sequence onto a roll of film as such documents are moved past said photograph position, a device for automatically recording data associated with said documents onto said film simultaneously with the photographing of such documents, said device comprising an electronic flasher having a flasher tube for generating a flash of light of predetermined intensity, light transmitting means for projecting said generated light as light images of data, one data image for each document image projected, into said optical path for recordation onto said film, said flasher having first capacitance means connected for charging from a source of electrical energy and upon discharge thereof effecting operation of said flasher tube to generate said light, control means in circuit with said first capacitance means being energizable to disconnect said first capacitance means from said flasher tube and upon deenergization adapted for connecting said first capacitance means to said flasher tube to operate same, an electrical timer having second capacitance means connected for charging from said source of electrical energy and including delay means in circuit with said second capacitance means to delay discharge of the latter, said timer being connected to said control means for energizing same upon discharge of said second capacitance means, and sensing means adapted for actuation by the next document to be photographed for disconnecting said second capacitance means from said source of electrical energy to provide discharge thereof, whereby the flasher tube is operated after a time interval determined by the discharge delay time of said second capacitance means.

9. The photographic copier of claim 8 wherein the control means includes a relay having a winding connected for energization by the second capacitance means, and the sensing means includes a switch having a movable arm in the path of movement of the documents to be photographed, said switch having contacts in circuit with the source of electrical energy and the timer.

10. The photographic copier of claim 9 wherein a second relay is provided and upon energization thereof effects operation of the photographing means, said second relay having a winding in circuit with the switch and said source of electrical energy and being energizable upon movement of the switch arm by the documents to be photographed, said second relay winding being deenergized upon disengagement of the switch arm from the documents.

References Cited by the Examiner
UNITED STATES PATENTS

| | | | |
|---|---|---|---|
| 1,204,098 | 11/16 | Watson | 88—24 |
| 2,458,882 | 1/49 | Stoner et al. | 346—107 |
| 2,557,026 | 6/51 | Budde | 88—24 |
| 2,578,320 | 12/51 | Schubert | 88—24 |
| 2,735,335 | 2/56 | Shaw | 88—24 |
| 2,928,328 | 3/60 | Klein. | |
| 2,952,504 | 9/60 | Path | 346—107 |

NORTON ANSHER, *Primary Examiner.*